(12) United States Patent
Kawakita et al.

(10) Patent No.: US 7,850,806 B2
(45) Date of Patent: Dec. 14, 2010

(54) WATERPROOF METHOD AND CONSTRUCTION FOR A WIRE END JOINT PORTION

(75) Inventors: Hiromichi Kawakita, Yokkaichi (JP); Hiroyuki Otsuki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 426 days.

(21) Appl. No.: 11/921,472

(22) PCT Filed: May 17, 2006

(86) PCT No.: PCT/JP2006/309786
§ 371 (c)(1), (2), (4) Date: Dec. 3, 2007

(87) PCT Pub. No.: WO2006/129477
PCT Pub. Date: Dec. 7, 2006

(65) Prior Publication Data
US 2009/0101268 A1     Apr. 23, 2009

(30) Foreign Application Priority Data
Jun. 2, 2005    (JP) .............................. 2005-163355

(51) Int. Cl.
  *B32B 37/00* (2006.01)
(52) U.S. Cl. .............................. 156/85; 156/47; 156/84
(58) Field of Classification Search .................. 156/47, 156/84, 85
See application file for complete search history.

(56) References Cited

U.S. PATENT DOCUMENTS

| | | | | |
|---|---|---|---|---|
| 3,448,182 A | * | 6/1969 | Derbyshire et al. | 264/456 |
| 3,768,941 A | * | 10/1973 | D'Ascoli et al. | 425/112 |
| 5,439,031 A | * | 8/1995 | Steele et al. | 138/89 |
| 5,895,890 A | | 4/1999 | Uchiyama et al. | |
| 6,951,491 B2 | | 10/2005 | Sakaguchi et al. | |
| 2006/0048965 A1 | * | 3/2006 | Ootsuki | 174/74 A |

FOREIGN PATENT DOCUMENTS

| | | |
|---|---|---|
| DE | 9010609 U1 | 5/1969 |
| DE | 4028769 A1 * | 3/1992 |
| EP | 0322168 A2 * | 6/1989 |
| JP | 53-72164 | 1/1978 |
| JP | 11-87007 | 3/1999 |
| JP | 11-178142 | 7/1999 |
| JP | 2001-338708 | 12/2001 |
| JP | 2005-5150 | 1/2005 |

* cited by examiner

*Primary Examiner*—Jeff H Aftergut
(74) *Attorney, Agent, or Firm*—Gerald E. Hespos; Michael J. Porco

(57) ABSTRACT

A waterproof method for a wire end joint includes expanding a heat shrinkable tube radially outwardly. The method then includes inserting the wire end joint and a melted thermosetting waterproofing agent through an opening at an end of the waterproof protection tube. A solidification starting temperature of the waterproofing agent is set higher than a shrinkage starting temperature of the heat shrinkable tube. The method then applies heating so that the heat shrinkable tube shrinks to the original diameter and so that the waterproofing agent is not solidified. The heating is continued to the solidification starting temperature after the heat shrinkable tube is shrunk to a set inner diameter, thereby causing the thermosetting waterproofing agent to be solidified.

12 Claims, 4 Drawing Sheets

(HEAT SHRINKAGE)

(TUBE SHRINKAGE)

WATERPROOF METHOD AND CONSTRUCTION FOR A WIRE END JOINT PORTION

BACKGROUND OF THE INVENTION

1. Field of the Invention

The present invention relates to a waterproof method for a wire end joint portion of a wiring harness to be installed in an automotive vehicle and a waterproof construction formed by this method and, more particularly, is designed to easily and reliably apply waterproofing to a wire end joint portion, which is formed by integrally welding exposed parts of cores at the ends of a plurality of wires, using a general-purpose tube instead of applying waterproofing by protecting the wire end joint portion by means of a special protection cap.

2. Description of the Related Art

Conventionally, in the case of connecting wires of a wiring harness to be installed in an automotive vehicle, insulation coatings are stripped at ends or intermediate portions of the wires to expose cores and exposed parts of the cores are connected by welding, soldering or crimp connection by a crimping terminal.

There are many cases where a protection cap made of resin is mounted on a wire end joint portion (end connecting spliced portion) formed by connecting cores at ends of a plurality of wires as above for the insulation protection. In a wiring harness to be installed in an engine compartment, which is a water exposed area, waterproofing is applied by filling a waterproofing agent 2 in the protection cap.

Specifically, after a specified amount of the waterproofing agent 2 is injected into a cap 1 by an injector (not shown) as shown in FIG. 5, a wire end joint portion Y of a wire group W is inserted into the cap 1 and the waterproofing agent 2 is solidified to seal the wire end joint portion Y for the waterproofing purpose.

However, the cap 1 is required to have a sufficiently large inner diameter due to the capability of the injector upon injecting the waterproofing agent into the cap 1. Further, the specifications of wire end joint portions Y largely differ and, hence, caps 1 capable of dealing with various sizes need to be used. This necessitates many kinds of caps, leading to a cost increase for mold production and consequently leading to a higher cost.

Further, in the case of using a cap selected from those prepared beforehand, the outer diameter of the cap is larger than the wire end joint portion Y, thereby presenting a problem of deteriorating space efficiency.

Particularly, in the case of accommodating the wire end joint portion Y into a corrugated tube, a corrugated tube having a large inner diameter needs to be used, therefore leading to increases of cost and necessary space. Further, if the inner diameter of the cap 1 increases, the amount of the waterproofing agent 2 to be injected also increases, leading to a cost increase also for the waterproofing agent 2.

In Japanese Unexamined Patent Publication No. H11-178142, a heat shrinkable tube 4 having a hot melt adhesive 3 applied to the inner wall thereof and having an opening at one end sealed by a hot melt agent 3' as shown in FIG. 6 is provided, a wire end joint portion Y is inserted into the heat shrinkable tube 4, and a clearance is filled up by melting the hot melt adhesive 3 simultaneously with the heat shrinkage of the heat shrinkable tube 4, thereby sealing the wire end joint portion Y.

However, there is a high possibility that the hot melt agent 3' used as a sealing member is also melted upon heating the heat shrinkable tube for heat shrinkage, the hot melt adhesive 3 leaks out of the heat shrinkable tube 4 while the melted hot melt agent 3' is cooled and solidified, and the wires W cannot be completely sealed without the hot melt agent 3' fulfilling its function as the sealing member. Further, if the hot melt agent 3 leaks out of the heat shrinkable tube 4, an operation becomes difficult to conduct for an operator.

The present invention was developed in view of the above problems and an object thereof is to provide a waterproofing method capable of solving the above problems occurring in the case of a using a heat shrinkable tube and having good waterproof performance and high operability while using the heat shrinkable tube filled with a waterproofing agent instead of using a protection cap as a resin molded article.

SUMMARY OF THE INVENTION

The invention is directed to a waterproof method for a wire end joint portion formed by integrally welding exposed parts of cores at ends of a plurality of wires forming a wiring harness to be installed in an automotive vehicle. The method includes preparing a waterproof protection tube in which one end of a transparent heat shrinkable tube is closed by a sealing member and expanding the heat shrinkable tube beforehand to have an inner diameter larger than the one when the heat shrinkable tube was formed. The method then includes inserting the wire end joint portion and a melted thermosetting waterproofing agent through an opening at the other end of the waterproof protection tube and setting the solidification starting temperature of the waterproofing agent higher than the shrinkage starting temperature of the heat shrinkable tube. The method further includes applying heating so that the inner diameter of the heat shrinkable tube shrinks to the one when the heat shrinkable tube was formed, wherein it is set such that the waterproofing agent is not solidified at the heating temperature and reaches the solidification starting temperature after the heat shrinkable tube is shrunk to have a set inner diameter, thereby being solidified.

According to the inventive waterproof method, the heat shrinkable tube continuously produced is used as a waterproof protection member instead of using a special molded protection cap. Thus, cost can be remarkably reduced. Further, if a plurality of sizes of heat shrinkable tubes are prepared and a heat shrinkable tube of the size conforming to the outer diameter of a wire end joint portion is selected and used, the heat shrinkable tube can be suitable for the outer diameter of the wire end joint portion in addition to the shrinkage of the heat shrinkable tube by a heating process. Therefore, enlargement and a resulting increase in installation space can be suppressed.

Since the waterproofing agent is injected in a melted state, there is an advantage that an injecting operation into the cap is more easily performed due to a large fluidity, and the waterproofing agent can reliably permeate between the wires and to every corner of the heat shrinkable tube, thereby improving waterproofness.

Further, since the solidification starting temperature of the waterproofing agent is set higher than the shrinkage starting temperature of the heat shrinkable tube, an occurrence of a situation where the waterproofing agent is solidified after the heat shrinkable tube is shrunk and the waterproofing agent is solidified earlier to hinder the shrinkage of the heat shrinkable tube can be prevented. As a result, the heat shrinkable tube can be completely shrunk to a specified dimension and can closely fit to the wire end joint portion, the outer shape of the heat shrinkable tube after the heating process can be minimized, and the enlargement of the wire end joint portion can be suppressed.

Further, since the heat shrinkable tube is transparent, whether or not the waterproofing agent is present, a welded portion has contacted the bottom and the amount of the waterproofing agent is proper can be easily confirmed by the eyes.

In addition, since the heat shrinkable tube is expanded to widen the inner diameter before heating, the operation of injecting the waterproofing agent into the heat shrinkable tube can be easily performed, thereby improving operability.

The heat shrinkable tube preferably is formed by continuously extruding a resin composition containing a polyethylene, a fluorinated polymer and a thermoplastic elastomer.

The heat shrinkable tube preferably is cross-linked and has the inner diameter expanded from fourfold to twofold by the irradiation of electron beams.

The heat shrinkable tube preferably is cut to a length, which is three to six times as long as that of the wire end joint portion.

The sealing member made of the same material as the heat shrinkable tube preferably is inserted into an opening at one end, and the shrinkable tube on the outer circumference of the sealing member is shrunk to secure the sealing member, thereby completing the waterproof protection tube.

The leading end of the wire end joint portion preferably is inserted up to a contact position with the sealing member into the waterproof protection tube, and the waterproofing agent is filled into the heat shrinkable tube within a range of $1/20$ to $1/10$ of the entire length of the heat shrinkable tube from the contact position with the sealing member.

The heat shrinkable tube preferably is shrunk when the temperature of the heat shrinkable tube reaches a temperature equal to or higher than 90° C. and lower than 120° C. by heating, and the temperature of the waterproofing agent reaches 120° C. or higher after the completion of the shrinkage of the heat shrinkable tube to solidify the waterproofing agent.

As described above, if heating is applied by external heating means such as a heater with the wire end joint portion and the waterproofing agent filled in the heat shrinkable tube, the heat shrinkable tube is first heated and starts shrinking upon reaching a specified temperature. Since the liquid temperature of the waterproofing agent is not heated to the solidification starting temperature until the completion of the shrinkage, the fluidity of the waterproofing agent can be kept during the shrinkage.

By continuing the heating after the completion of the shrinkage, the liquid temperature of the waterproofing agent increases to reach the solidification starting temperature and the waterproofing agent starts solidifying.

By solidifying the waterproofing agent with a time difference utilizing the heat for shrinking the heat shrinkable tube, facilities can be simplified and the operation time can be shortened.

With the opening at the end of the cut heat shrinkable tube sealed by the sealing member, the heat shrinkable tube is heat shrunk at the mount position of the sealing member to adhere to the sealing member, thereby forming a closed portion. Thus, the tube can be sealed well, the leakage of the waterproofing agent can be prevented even if the waterproofing agent is melted during the heating, and the wire end joint portion can be completely surrounded by the waterproofing agent.

Further, since the sealing member used is made of the same material as the heat shrinkable tube, there is a high affinity between the opening at the one end of the heat shrinkable tube and the sealing member and, in this respect as well, airtightness can be improved.

The heat shrinkable tube preferably has a thickness of 1 to 2 mm, an inner diameter of 3 to 5 mm and a length of 50 to 80 mm after the shrinkage.

The thickness of the heat shrinkable tube needs to be at least 1 mm or larger in order to prevent the breakage since the burr length of the wire end joint portion is within 1 mm. However, if the thickness is too large, the final shape becomes thick, wherefore the thickness of the heat shrinkable tube is set within the range of 1 to 2 mm.

If the inner diameter of the heat shrinkable tube is set to 3 to 5 mm, the wire end joint portion can be inserted into the tube without any problem since the outer diameter of the wire end joint portion normally lies within the above range.

Further, if the length of the heat shrinkable tube is set to 50 to 80 mm, the entire welded or soldered wire end joint portion and the wires continuously following the wire end joint portion can be inserted to a specified depth into the tube.

The present invention also provides a waterproof construction for a wire joint portion which is formed by the above method and in which a heat shrinkable tube is fitted on the wire end joint portion. Since the outer diameter of the heat shrinkable tube fitted on the wire end joint portion is 1.3 to 1.8 times as large as that of the wire end joint portion in this waterproof construction, enlargement can be suppressed and an increase of an occupied space can be prevented.

As is clear from the above description, the heat shrinkable tube is cut and used as the waterproof protection tube instead of using a special waterproof protection cap, which is molded, in the present invention. Thus, cost can be reduced. Further, since the diameter of the tube is narrowed through heat shrinkage, there are various advantages such as no need to use a large-diameter corrugated tube, particularly in the case of accommodating the wire end joint portion into a corrugated tube without excessively increasing an improvement of protection for the wire end joint portion.

DETAILED DESCRIPTION OF THE PREFERRED EMBODIMENT

One embodiment of the present invention is described with reference to the accompanying drawings.

Figure 1:
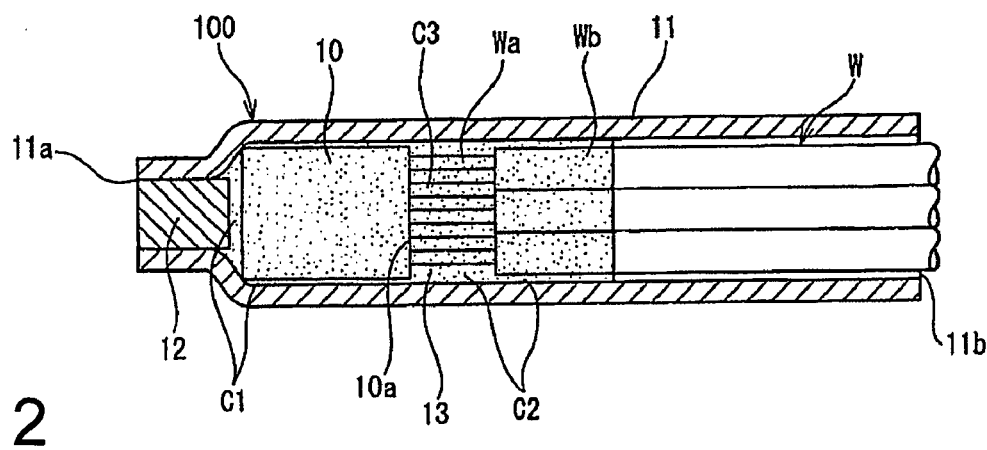
FIG. 1 is a section showing a waterproof protection construction for a wire end joint portion according to one embodiment of the invention.

FIG. 1 shows a waterproof construction for a wire end joint portion formed by a method to be described later.

A wire end joint portion 10 is formed by integrally ultrasonic welding exposed parts Wa of cores at ends of a plurality of (three in this embodiment) wires w. It should be noted that resistance welding may be adopted instead of ultrasonic welding.

The wire end joint portion 10 is accommodated in a waterproof protection tube 100 comprised of a transparent heat shrinkable tube 11 cut to a desired length and a sealing member 12 for closing one end of the heat shrinkable tube 11.

The sealing member 12 is inserted through one end opening 11a of the heat shrinkable tube 11, and one end side 11a of the heat shrinkable tube 11, which becomes the outer circumference of the sealing member 12, is heat shrunk to adhere, whereby the heat shrinkable tube 11 is provided with a closed end.

The heat shrinkable tube 11 shown in FIG. 1 is in a state after shrinkage, and a thermosetting waterproofing agent 13 is filled in the heat shrinkable tube 11 from the sealing member 12 to a coated wire side 10a over the wire end joint portion 10. The waterproofing agent 13 is filled in a clearance C1 between the sealing member 12, the heat shrinkable tube 11 and the wire end joint portion 10, a clearance C2 between an exposed core part Wa and a coated wire part Wb continuously following the wire end joint portion 10 and the inner circumferential surface of the heat shrinkable tube 11, and a clearance C3 between the exposed core part Wa and the coated wire part Wb, thereby completing sealing the wire end joint portion 10 with the waterproofing agent 13.

In the heat shrinkable tube 11, the waterproofing agent 13 is not filled in a specified area from an opening 11b at a wire insertion side, in other words, the length of the heat shrinkable tube 11 is set such that the waterproofing agent 13 does not leak out through the opening 11b when the waterproofing agent 13 is melted. Specifically, the length of the heat shrinkable tube 11 is three to six times as long as that of the wire end joint portion 10.

The heat shrinkable tube 11 is formed by continuously extruding a resin composition containing a polyethylene, a fluorinated polymer and a thermoplastic elastomer, and is made of an ethylene vinylacetate in this embodiment.

A two-liquid hardening epoxy, a urethane, a silicon or the like is suitably used as the thermosetting waterproofing agent 13. In this embodiment, the two-liquid hardening epoxy is used, and the solidification starting temperature thereof is so set that the waterproofing agent 13 is not solidified at a shrinkage temperature of the heat shrinkable tube 11.

The heat shrinkable tube 11 has a thickness of 1 to 2 mm, an inner diameter of 3 to 5 mm and a length of 50 to 80 mm in a completed state after the shrinkage. Further, the outer diameter of the heat shrinkable tube 11 is 1.3 to 1.8 times as larger as that of the wire end joint portion 10.

Next, the method for forming the protection construction for the wire end joint portion by inserting the wire end joint portion 10 into the waterproof protection tube 100 in which one end of the heat shrinkable tube 11 is closed by the sealing member 12 and shielding the wire end joint portion 10 using the waterproofing agent 13 is described.

Figure 2:
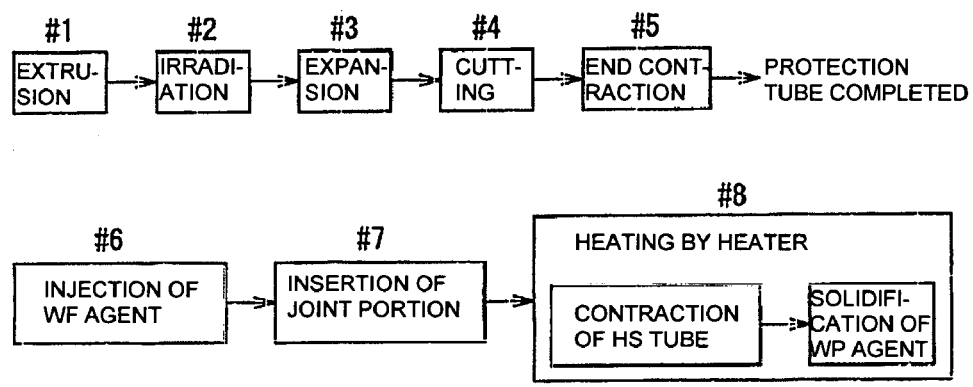
FIG. 2 is a block diagram showing the procedure of an inventive method.

As shown in FIG. 2, the heat shrinkable tube to be used is first formed.

In Step #1, extrusion molding is carried out using a resin composition containing an ethylene vinylacetate as a main component to form a transparent continuous tube having specified thickness, inner diameter and outer diameter.

In Step #2, the extruded continuous tube is irradiated with electron beams at room temperature to undergo crosslinking, thereby becoming made of cross-linked ethylene vinylacetate.

In Step #3, the continuous tube made of the cross-linked ethylene vinylacetate is expanded by being heated at a temperature higher than its melting point, thereby making the inner diameter thereof two to four times as large, and is cooled in this state. In this way, a shrinking function to return to dimensions before the expansion when being heated again is given.

In Step #4, the continuous tube given with the heating shrinking function is cut to a specified length (50 to 90 mm), which is three to six times as long as the length of the wire end joint portion 10, thereby forming the heat shrinkable tube 11 having the aforementioned specified length.

It should be noted that a SUMITUBE (produced by Sumitomo Electric Fine Polymer Inc.) can be, for example, used as the heat shrinkable tube.

In this embodiment, the inner diameter is 3.7 mm at the time of extrusion, 10 mm at the time of expansion, the thickness is 1 mm and the length is 70 mm.

It should be noted that heat shrinkable tubes come in small-diameter, middle-diameter and large-diameter sizes within such a range that the inner diameter is 3 to 5 mm, the thickness is 1 to 2 mm and the length is 50 to 90 mm.

In Step #5, the sealing member 12 made of the same polyolefin as the above heat shrinkable tube and colored in black or another color is inserted into the opening 11a at the one end of the heat shrinkable tube 11 cut to the specified length. In this state, only an end of the outer circumferential part of the heat shrinkable tube 11 having the sealing member 15 inserted therein is heated, whereby the heat shrinkable tube 11 is shrunk to adhere to the sealing member 15, with the result that the opening 11a at the one end of the heat shrinkable tube 11 is so closed as not to cause any liquid leakage. In other words, an end closing portion is formed in the heat shrinkable tube 11 by the shrinkage of the end, thereby completing the waterproof protection tube 100 similar to the conventional cap as a molded article.

Figure 3:
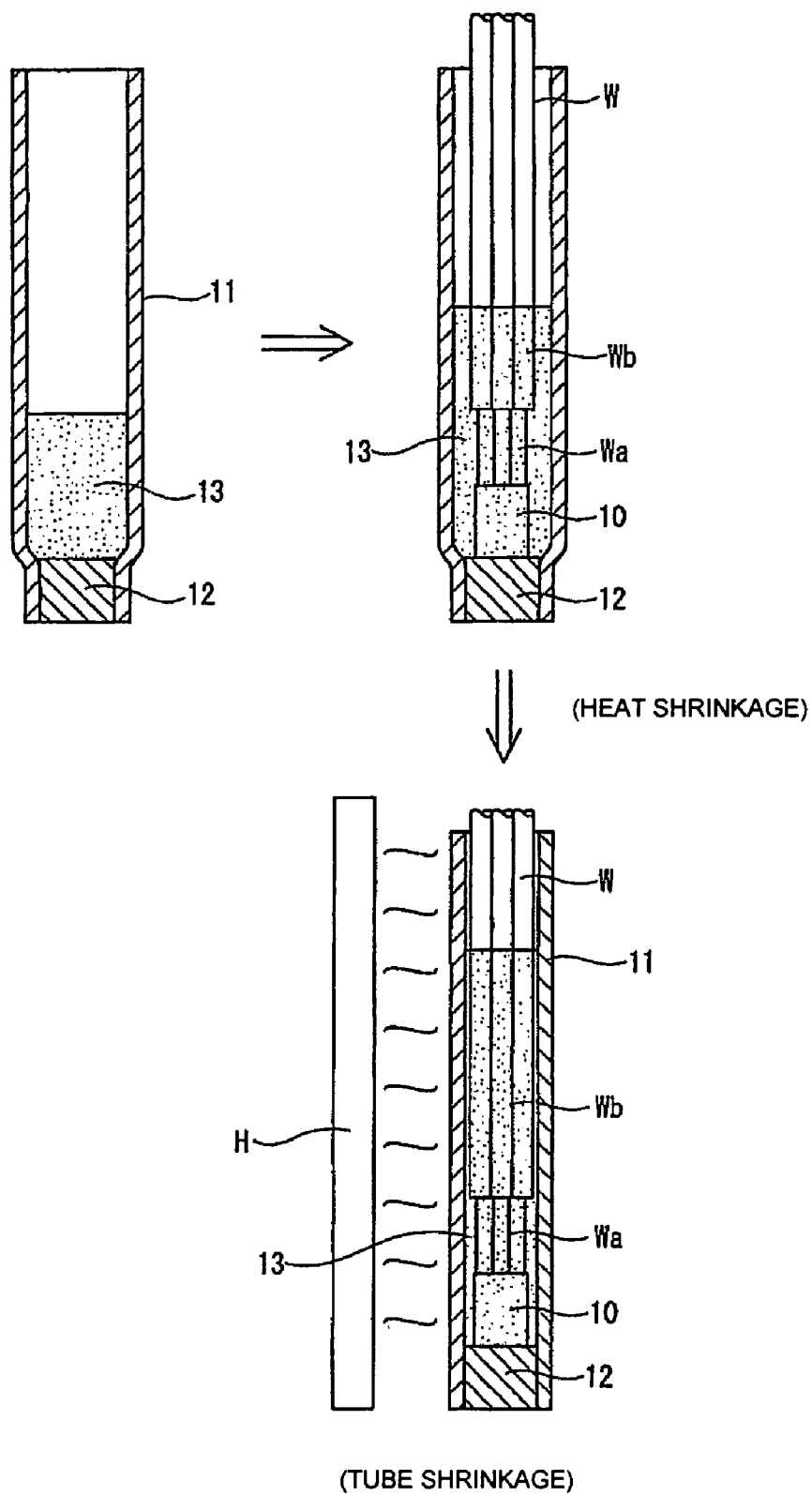
FIG. 3 is a schematic diagram showing the inventive method.

Next, the procedure of the waterproofing to the wire end joint portion 10 using the above waterproof protection tube 100 is described with reference to FIGS. 2 and 3.

In Step #6, the waterproofing agent 13 is injected through the opening 11b of the heat shrinkable tube 11 expanded before the heat shrinkage. An injected amount of the waterproofing agent 13 is so set as not to fill up to the opening 11b, but to fill in a part of the heat shrinkable tube 11 about ½₀ to ⅟₁₀ of the entire length thereof while a space S is formed. Therefore, the waterproofing agent 13 does not reach the opening 11b even if the heat shrinkable tube 11 is shrunk to have a smaller diameter.

Subsequently, in Step #7, the wire end joint portion 10 is inserted through the opening 11b of the heat shrinkable tube 11 until the leading end thereof reaches the sealing member 12, and the wire end joint portion 10, the exposed core part Wa continuously following the wire end joint portion 10, but not joined, and the coated part Wb continuously following the exposed core part are immersed in the waterproofing agent 13.

Since the two-liquid solidifying epoxy liquid, which has a low viscosity even in a room temperature atmosphere, is used as the waterproofing agent 13 in this embodiment, the waterproofing agent 13 can reliably permeate and fill into the above clearances C1 to C3 such as the clearance between the wire end joint portion 10 and the inner circumferential surface of the heat shrinkable tube 11.

The two-liquid solidifying epoxy resin used as the waterproofing agent 13 is assumed not to be solidified at a temperature equal to or higher than a shrinkage temperature of 90° C. of the heat shrinkable tube 11, but to start solidification at 120° C. or higher.

Subsequently, as shown in Step #8, a heater H is used as heating means and the temperature thereof is set to 130° C. for heating.

By this heating, the heat shrinkable tube 11 is first heated and the waterproofing agent 13 inside is heated by the heat transfer from the heat shrinkable tube 11.

When the heat shrinkable tube 11 reaches 90° C. by heating, shrinkage starts. At this time, since the solidification starting temperature of the waterproofing agent 13 is set at 120° C., the shrinkage of the heat shrinkable tube 11 can be finished while the waterproofing agent 13 remains fluid.

Thus, in the process of shrinking the heat shrinkable tube 11, the waterproofing agent 13 is not solidified yet and can be caused to flow along the inner circumferential surface of the shrinking heat shrinkable tube 11. As a result, the clearances C1, C2 between the inner circumferential surface of the narrowing heat shrinkable tube 11 and the wire end joint portion 10, the exposed core part 1Wa and the coated wire part Wb become gradually narrower, but the waterproofing agent 13 can be reliably filled into these clearances C1, C2. Since the inner volume decreases by the heat shrinkage of the heat shrinkable tube 11, the liquid level of the waterproofing agent 13 rises even if a small amount of the waterproofing agent 13 is injected, and the waterproofing agent 13 moves toward the opening 11b at the insertion side, wherefore the waterproofing agent 13 can reliably surround the exposed core part Wa continuously following the wire end joint portion and the coated wire part Wb continuously following the exposed core part Wa.

By further applying heating after the completion of the shrinkage of the heat shrinkable tube 11, the waterproofing agent 13 reaches a temperature equal to or higher than 120° C., whereby the solidification of the waterproofing agent 13 starts.

In this way, the waterproofing agent 13 is kept fluid to completely permeate into the clearances until the shrinkage of the heat shrinkable tube 11 to a specified size is completed, and is solidified thereafter. Thus, the wire end joint portion 10, the exposed core part Wa continuously following the wire end joint portion and the coated wire part Wb continuously following the exposed core part Wa can be embedded in the solidified waterproofing agent 13, and the waterproofing agent 13 can be caused to adhere to the inner circumferential surface of the shrunk heat shrinkable tube 11.

Figure 4:
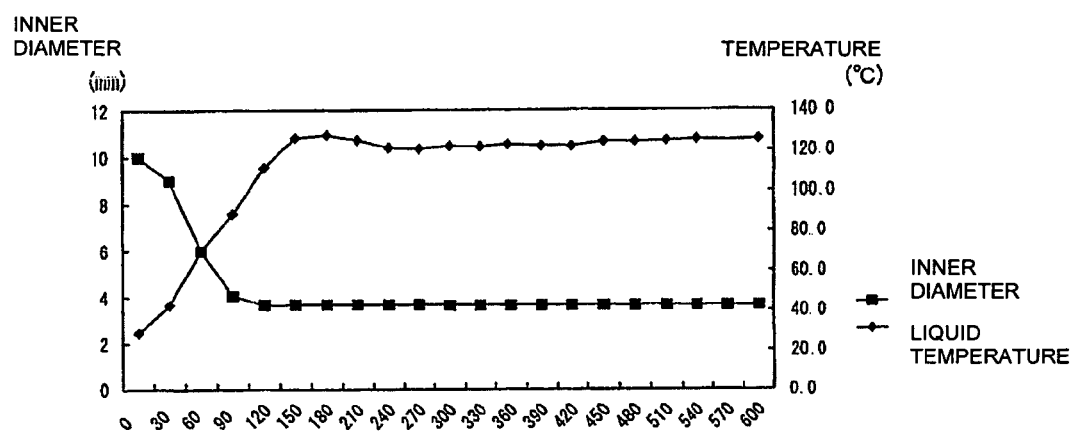
FIG. 4 is a graph showing a correlative relationship of tube inner diameter, liquid temperature of a waterproofing agent, heating temperature and heating time.
Figure 5:
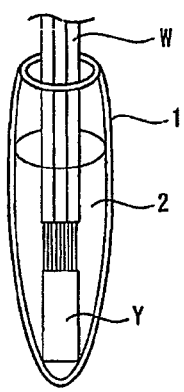
FIG. 5 is a diagram showing a prior art.
Figure 6:
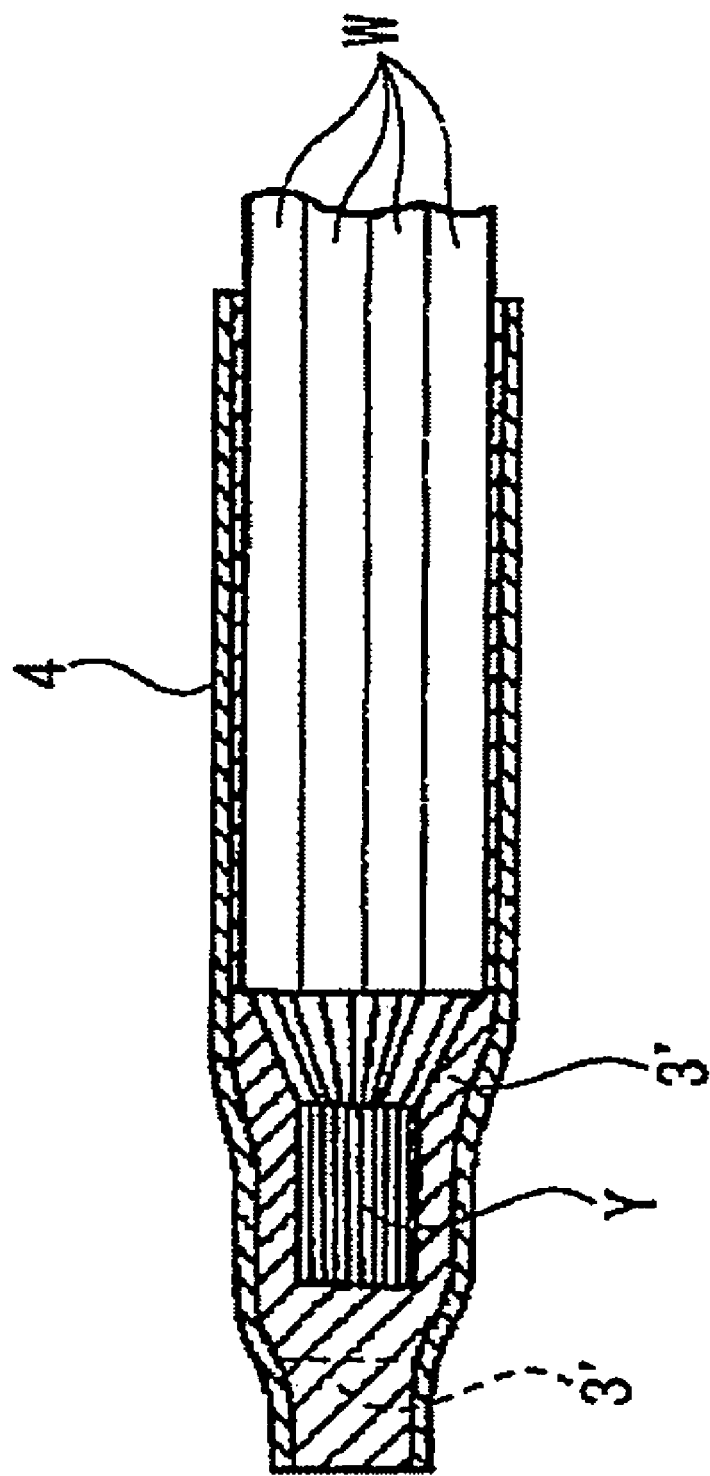
FIG. 6 is a diagram showing another prior art.

FIG. 4 is a graph showing a correlative relationship of the inner diameter of the heat shrinkable tube 11 made of polyethylene, the liquid temperature of the waterproofing agent made of the two-liquid epoxy resin, heating temperature and heating time.

As shown in this graph, if heating is applied with the heater set to 130° C. in an expanded state where the inner diameter of the heat shrinkable tube 11 is 10 mm, the heat shrinkable tube 11 first starts shrinking at a temperature below 120° C. and the inner diameter thereof becomes about 4 mm within 120 seconds to finish the shrinkage.

The temperature of the waterproofing agent 13 is about 100° C. when the shrinkage of the heat shrinkable tube 11 finishes, but the waterproofing agent 13 having a solidification starting temperature of 120° C. or higher is not solidified to remain fluid.

If heating is continued after the completion of the shrinkage of the heat shrinkable tube, the liquid temperature of the waterproofing agent 13 increases to reach 130° C. or higher, whereby the waterproofing agent 13 starts solidifying.

As described above, by setting the solidification starting temperature of the waterproofing agent higher than the heat shrinkage temperature of the heat shrinkable tube, the waterproofing agent can be solidified after the completion of the shrinkage of the heat shrinkable tube, the heat shrinkable tube can be shrunk as set, and the waterproofing agent can closely adhere to the inner circumferential surface of the shrunk heat shrinkable tube, with the result that both the narrower diameter and the waterproofness can be balanced with each other.

Further, the waterproofing agent can be solidified utilizing the shrinkage temperature of the heat shrinkable tube to improve operability.

Since the diameter of the heat shrinkable tube 11 surrounding the wire end joint portion 10 is narrowed, a large corrugated tube needs not be used in the case of accommodation into the corrugated tube, wherefore a cost reduction and space saving can be realized. Further, if the sealing member 12 is colored to be easily distinguishable, the kinds can be judged even if there are many kinds of heat shrinkable tubes. Further, if the tube is transparent and the sealing member is colored, it can be confirmed by the eyes whether or not the wire end joint portion has been inserted to a contact position with the sealing member 12.

What is claim is:

1. A waterproof method for a wire end joint portion formed by integrally welding exposed parts of cores at ends of a plurality of wires forming a wiring harness to be installed in an automotive vehicle, comprising the steps of:

preparing a transparent heat shrinkable tube having an inner diameter, a first open end, and a second open end;

expanding the heat shrinkable tube to an inner diameter larger than the inner diameter when the heat shrinkable tube was formed;

inserting a sealing member into the first open end of the transparent heat shrinkable tube;

heating the first open end sufficiently so that a portion of the transparent heat shrinkable tube near the first open end shrinks and adheres to the sealing member;

injecting a melted thermosetting waterproofing agent into the second end of the tube, the waterproofing agent having a solidification starting temperature higher than a shrinkage starting temperature of the heat shrinkable tube;

inserting the wire end joint portion through the second open end of the waterproof protection tube so that the exposed parts of the cores of the wires are immersed in the melted waterproofing agent; and heating the heat shrinkable tube to a first temperature sufficient to shrink the heat shrinkable tube without solidifying the melted waterproofing agent so that the heat shrinkable tube causes the melted waterproofing agent to fill clearances adjacent to the wire end joint portion; and continuing heating the heat shrinkable tube to a second temperature sufficient to solidify the waterproofing agent after the heat shrinkable tube is shrunk thereby causing the waterproof agent to become solidified.

2. A waterproof method for a wire end joint portion according to claim 1, wherein the step of preparing a transparent heat shrinkable tube comprises:

continuously extruding a resin composition containing a polyethylene, a fluorinated polymer and a thermoplastic elastomer into a tube shape, cross-linking the heat shrinkable tube by irradiation of electron beams, cutting the heat shrinkable tube to a length, which is three to six times as long as that of the wire end joint portion, and wherein the sealing member made of the same material as the heat shrinkable tube;

the wire end joint portion is inserted to a contact position with the sealing member into the waterproof protection tube, and the waterproofing agent is filled into the heat shrinkable tube within a range of $\frac{1}{20}$ to $\frac{1}{10}$ of the entire length of the heat shrinkable tube from the contact position with the sealing member, and the heat shrinkable tube is shrunk when the temperature of the heat shrinkable tube reaches a temperature equal to or higher than 90° C. and lower than 120° C. by heating, and the temperature of the waterproofing agent reaches 120° C. or higher after the completion of the shrinkage of the heat shrinkable tube to solidify the waterproofing agent.

3. A waterproof method for a wire joint portion according to claim 1, wherein the heat shrinkable tube has a thickness of 1 to 2 mm, an inner diameter of 3 to 5 mm and a length of 50 to 80 mm after the shrinkage.

4. A waterproof construction for a wire joint portion formed by the method according to claim 1, characterized in that the outer diameter of the heat shrinkable tube fitted on the wire end joint portion is 1.3 to 1.8 times as large as that of the wire end joint portion.

5. A method for waterproofing a wire end joint portion formed by integrally welding exposed parts of cores at ends of a plurality of wires of a wiring harness, comprising:

provding a heating shrinkable tube having an initial inner diameter;

expanding the heat shrinkable tube to an inner diameter larger than the initial inner diameter;

inserting a sealing member into an opening at a first end of the waterproof protection tube;

heating the first open end sufficiently so that a portion of the transparent heat shrinkable tube near the first open end shrinks and adheres to the sealing member, inserting the wire end joint portion and a melted thermosetting waterproofing agent through an opening at a second end of the waterproof protection tube, the waterproofing agent having a solidification starting temperature higher than a shrinkage starting temperature of the heat shrinkable tube, and heating the heat shrinkable tube to the shrinkage starting temperature so that the inner diameter of the heat shrinkable tube shrinks substantially to the initial inner diameter of the heat shrinkable tube; and continuing the heating of the waterproof protection tube to the solidification starting temperature of the thermosetting waterproofing resin so that heat transfers through the heat shrinkable tube to the waterproofing agent, thereby causing the waterproofing agent to become solidified.

6. The method of claim 5, wherein the heat shrinkable tube is formed by continuously extruding a resin composition containing a polyethylene, a fluorinated polymer and a thermoplastic elastomer.

7. The method of claim 6, wherein the heat shrinkable tube is cross-linked by irradiating the heat shrinkable tube with electron beams.

8. The method of claim 5, wherein the heat shrinkable tube is cut to a length that is three to six times as long as a length of the wire end joint portion.

9. The method of claim 5, wherein a leading end of the wire end joint portion is inserted up to a contact position with the seal into the heat shrinkable tube, and the waterproofing agent is filled into the heat shrinkable tube within a range of 1/20 to 1/10 of the entire length of the heat shrinkable tube from the contact position with the seal.

10. The method of claim 5, wherein the heat shrinkable tube is shrunk by heating the heat shrinkable tube to a temperature of at least 90° C., but lower than 120° C., and the waterproofing agent is solidified by heating to a temperature of at least 120° C. after completion of the shrinkage of the heat shrinkable tube.

11. The method of claim 5, wherein the heat shrinkable tube has a thickness of 1 to 2 mm, an inner diameter of 3 to 5 mm and a length of 50 to 80 mm after shrinkage.

12. The method of claim 7 wherein the inner diameter is expanded from fourfold to twofold.

* * * * *